(12) United States Patent
Wang et al.

(10) Patent No.: US 11,810,249 B2
(45) Date of Patent: Nov. 7, 2023

(54) 3D POINT CLOUD PROCESSING

(71) Applicant: Signetron Inc., Berkeley, CA (US)

(72) Inventors: Richard Wang, San Jose, CA (US); Avideh Zakhor, Berkeley, CA (US)

(73) Assignee: Signetron Inc., Berkeley, CA (US)

(*) Notice: Subject to any disclaimer, the term of this patent is extended or adjusted under 35 U.S.C. 154(b) by 0 days.

(21) Appl. No.: 17/567,748

(22) Filed: Jan. 3, 2022

(65) Prior Publication Data

US 2023/0215088 A1 Jul. 6, 2023

(51) Int. Cl.
*G06T 17/00* (2006.01)
(52) U.S. Cl.
CPC .................... *G06T 17/00* (2013.01)
(58) Field of Classification Search
CPC ......... G06T 17/00; G06T 17/30; G06T 17/05; G06T 19/00; G06T 15/00; G06T 2210/04; G06T 17/10; G06T 2210/56; G06T 2207/10028
See application file for complete search history.

(56) References Cited

U.S. PATENT DOCUMENTS

| | | | | |
|---|---|---|---|---|
| 2018/0247447 A1* | 8/2018 | Serna | ...................... | G06T 15/40 |
| 2019/0371056 A1* | 12/2019 | Wetzel | .................... | G01S 17/42 |
| 2020/0349761 A1* | 11/2020 | Zhang | .................... | G06T 15/10 |
| 2022/0343105 A1* | 10/2022 | Li | ......................... | G06T 3/0012 |

* cited by examiner

*Primary Examiner* — Hau H Nguyen
(74) *Attorney, Agent, or Firm* — Kali-Law Group, P.C.

(57) ABSTRACT

Methods for processing a 3D point cloud of a building into polygons using an electronic computing device are presented, the methods including: causing the electronic computing device to receive the 3D point cloud; causing the electronic computing device to segment the 3D point cloud into a number of facades; and causing the electronic computing device to generate a number of polygons representing the number of facades. In some embodiments, the causing the electronic computing device to segment the 3D point cloud into a number of facades includes: performing voxel downsampling operation on the 3D point cloud; calculating a point normal for every point in the voxel downsampled 3D point cloud; and performing region growing to find each of the number of facades.

19 Claims, 10 Drawing Sheets

3D POINT CLOUD PROCESSING

This invention was made with government support under DE-EE0009067 awarded by the U.S. Department of Energy. The government has certain rights in the invention.

BACKGROUND

In many applications, there is a need to create an accurate dimensional model of an existing building. Needs include renovation, remodeling, and/or recladding. In a recladding application, for example, the exterior of a building may be covered with insulation panels in order to improve the energy efficiency of the building. In conventional methods, a 3D laser scanner may be utilized to create a point cloud of the subject building. This point cloud is then converted into industry standard files. One example of an industry standard file is REVIT®, which is a file format from AUTODESK®. Industry standard files generally perform adequately for new construction which has straight, plumb, vertical, Manhattan, and 90-degree facades. However, older buildings typically do not have rectangular, planar, straight, plumb, vertical, Manhattan, and 90-degree facades due to aging and settling. In practice, conventional methods forcibly convert all of these non-ideal facades into 90-degree, plumb, Manhattan, and rectangular facades which may not accurately reflect reality.

As such, methods for processing 3D point clouds into polygons are presented herein.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

As such, methods for processing a 3D point cloud of a building into polygons using an electronic computing device are presented, the methods including: causing the electronic computing device to receive the 3D point cloud; causing the electronic computing device to segment the 3D point cloud into a number of facades; and causing the electronic computing device to generate a number of polygons representing the number of facades. In some embodiments, the causing the electronic computing device to segment the 3D point cloud into a number of facades includes: performing voxel downsampling operation on the 3D point cloud; calculating a point normal for every point in the voxel downsampled 3D point cloud; and performing region growing to find each of the number of facades. In some embodiments, calculating the point normal encodes information corresponding with the surface of a plane by finding adjacent points and calculating a principal axis of the adjacent points using a covariance analysis. In some embodiments, the performing region growing includes: creating a façade set; pushing onto a queue a point from the 3D point cloud and the point normal corresponding with the point; selecting a topmost point and corresponding point normal from the queue; removing the selected topmost point and corresponding point normal from the queue; adding the selected topmost point and corresponding point normal from the queue to the façade set; performing a neighborhood search around the added topmost point in the façade set; if a neighboring point matches the topmost point in the façade set, adding the neighboring point to the queue; if the queue is empty, saving all points in the façade set as a façade point cloud; classifying the façade point cloud; calculating a bounding box of the façade point cloud; and retaining all desired facades. In some embodiments, methods further include: after performing the neighborhood search around the added topmost point in the façade set, if the queue is not empty, returning to selecting the topmost point. In some embodiments, methods further include continuing to the creating the façade set until all points in the 3D point cloud are processed. In some embodiments, causing the electronic computing device to generate a number of polygons representing the number of facades includes: detecting neighboring facades of selected facades; pruning extraneous facades; and polygonising the selected façades remaining after the pruning. In some embodiments, detecting neighboring facades includes: selecting a façade; selecting a potential neighboring façade; computing a line of intersection between the façade and the potential neighboring façade; and sampling points along the line of intersection, wherein if sampled points are present in both facades, the potential neighboring façade is a neighboring façade. In some embodiments, polygonising remaining facades includes: computing points of intersections in the facade; verifying edges of the façade such that each verified edge must border a side of the facade such that there are only points on one side of the facade; and forming a polygon from verified edges that represents the façade.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

As will be appreciated by one skilled in the art, the present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals/per se/, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

In still other instances, specific numeric references such as "first material," may be made. However, the specific numeric reference should not be interpreted as a literal sequential order but rather interpreted that the "first material" is different than a "second material." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

Traditional methods of converting 3D point cloud to Building Information Modeling (BIM) entails tracing the point cloud by hand on the screen. This process is tedious, time consuming and error prone. Embodiment methods disclosed herein has been shown to be 3× to 5× faster than traditional point cloud tracing. Embodiments provide productivity enhancement tools for scan to BIM conversion of the exterior. In developing such a tool, building facades that may not be vertical or planar due to the age of buildings must be accounted for. Thus, it is important to capture these non-idealities during the BIM conversion so as not to compromise the accuracy of the model.

Figure 1:
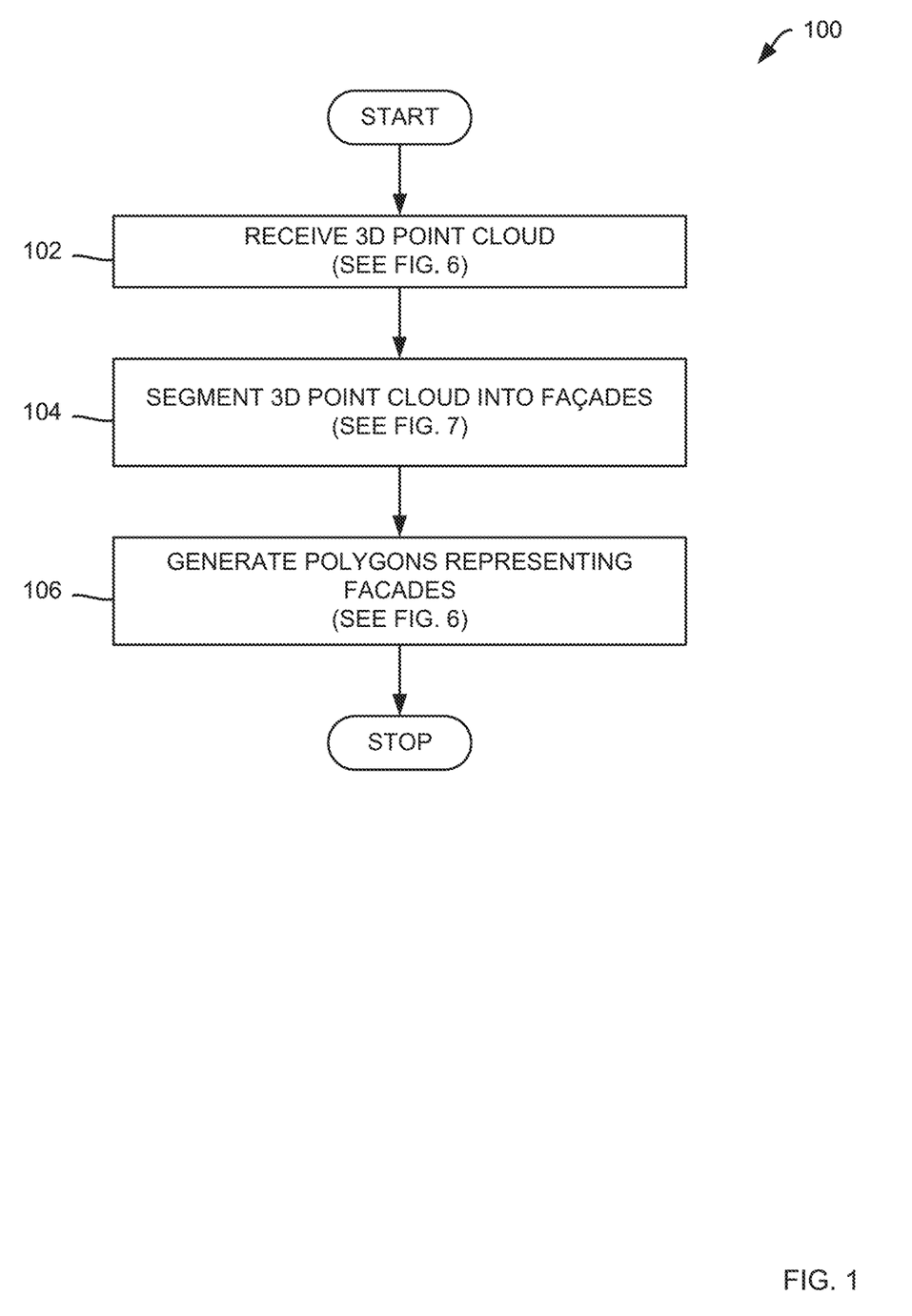
FIG. 1 is an illustrative flowchart of an overview of methods for processing a 3D point cloud into polygons in accordance with embodiments of the present invention.
Figure 6:
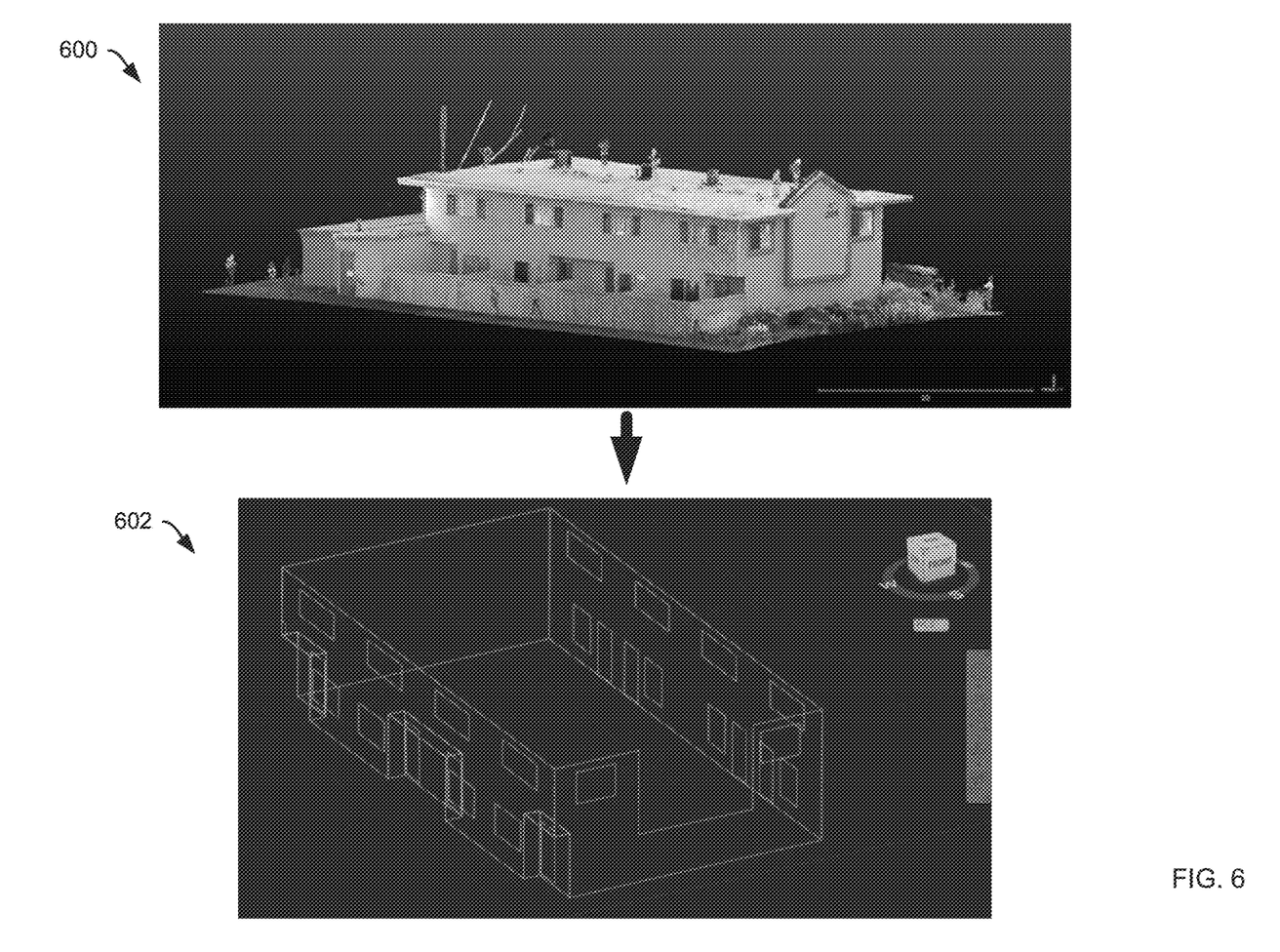
FIG. 6 is an illustrative representation of a 3D point cloud and corresponding polygonised facades in accordance with embodiments of the present invention.
Figure 7:
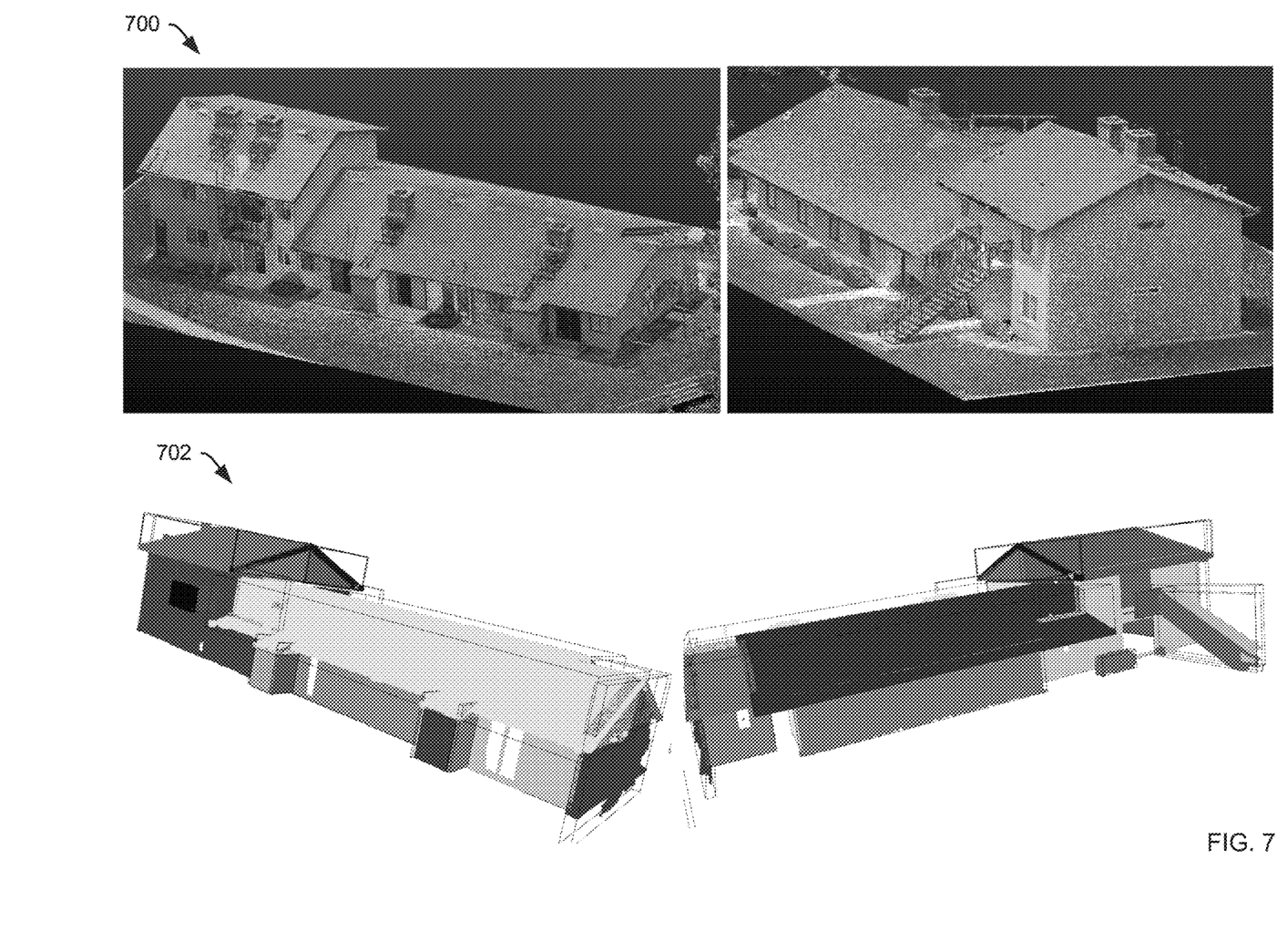
FIG. 7 is an illustrative representation of façade segmentation in accordance with embodiments of the present invention.

FIG. 1 is an illustrative flowchart 100 of an overview of methods for processing a 3D point cloud into polygons in accordance with embodiments of the present invention. As illustrated, at a first step 102, the method receives a 3D point cloud. In embodiments, a 3D point cloud of a building may be received from a scan utilizing any manner known in the art without departing from embodiments provided herein. Turning briefly to FIG. 6, FIG. 6 is an illustrative representation of a 3D point cloud 600 and corresponding polygonised facades 602 in accordance with embodiments of the present invention. As illustrated, 3D point cloud 600 is a 3D visualization made up of thousands or even millions of georeferenced points. Point clouds are essentially the simplest form of 3D models. They are collections of individual points plotted in 3D space. Each point contains several measurements, including its coordinates along the X, Y, and Z-axes, and sometimes additional data such as a color value, which is stored in RGB format, and luminance value, which determines how bright the point is. Turning back to FIG. 1, at a next step 104, the method segments the 3D point cloud into a number of façades. This step is also referred to as façade segmentation. Turning briefly to FIG. 7, FIG. 7 is an illustrative representation of façade segmentation in accordance with embodiments of the present invention. As illustrated, 3D point cloud 700 may be processed into models 702 having facades. Façade segmentation will be discussed in further detail below for FIGS. 2 and 3. Turning back to FIG. 1, at a next step 106, the method generates polygons that represent the segmented facades of step 104. Turning to FIG. 6, as illustrated, 3D point cloud 600 is processed into corresponding polygonised facades 602. Embodiments create polygonised facades that are dimensionally and spatially accurate regardless of size or shape. In this manner, a model that accurately reflects reality may be created.

Figure 2:
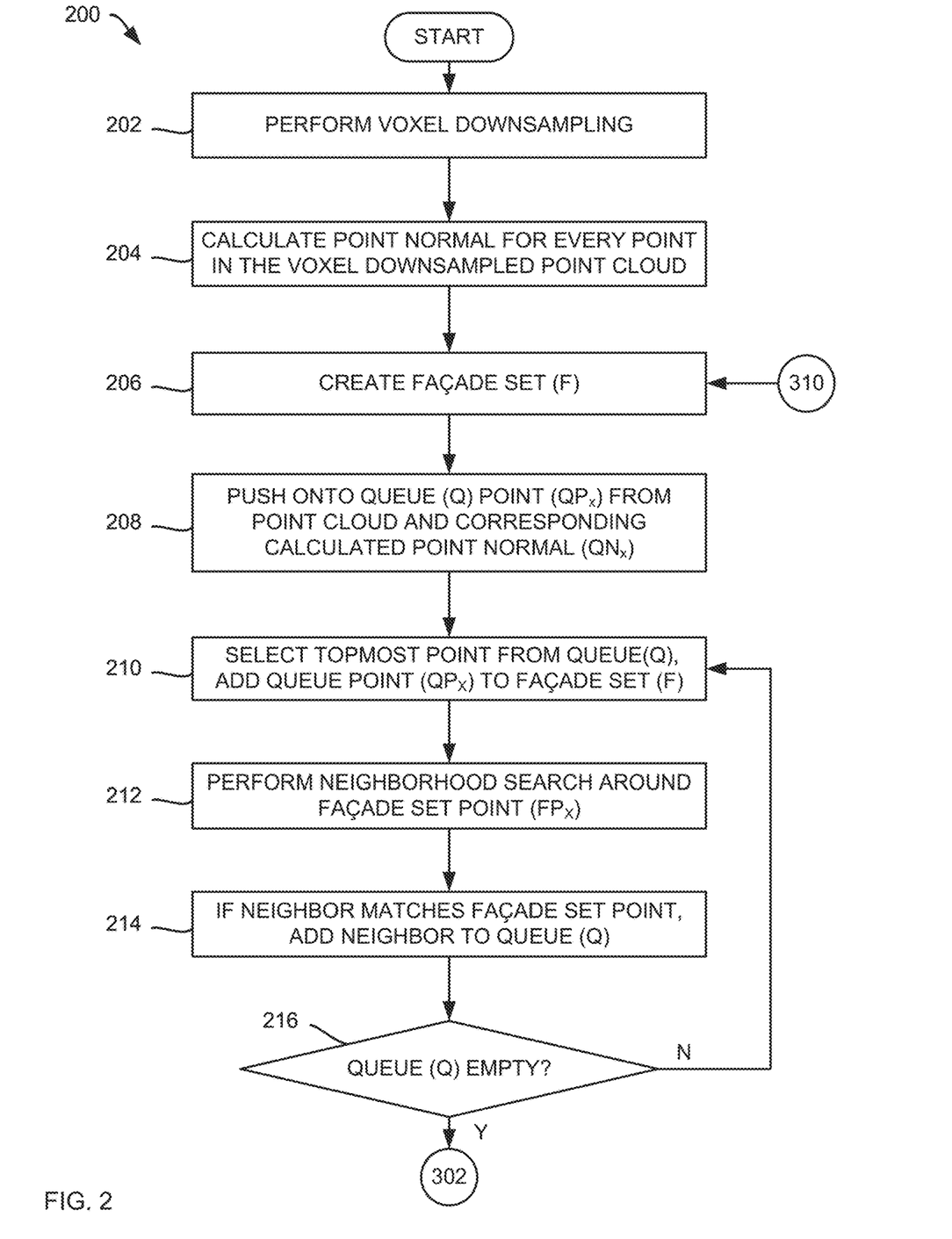
FIG. 2 is an illustrative flowchart of methods for façade segmentation in accordance with embodiments of the present invention.

FIG. 2 is an illustrative flowchart 200 of methods for façade segmentation in accordance with embodiments of the present invention. As illustrated, at a first step 202, the method performs voxel downsampling in order to improve the runtime of the algorithm. In order to generate the voxel downsampling, all points within a voxel (3D unit box) are bucketed and all of the points are averaged to produce a new point within the voxel. Voxel downsampling provides a more uniformly spaced set of points as well as a smaller dataset that retains the same information but speeds up runtime. Voxel downsampling may be performed utilizing any method known in the art without departing from embodiments provided herein. At a next step 204, the method calculates a point normal for every point in the voxel downsampled point cloud. In order to encode the information about the surface of a plane, the point normal for every point in the point cloud is calculated. This is accomplished by taking all the points in a radius nearest neighbor search of the point and computing the principal axis according to covariance analysis. As such, calculating the point normal encodes information corresponding with the surface of a plane by finding adjacent points and calculating a principal axis of the adjacent points using a covariance analysis. As with voxel downsampling, calculating a point normal may be performed utilizing any method known in the art without departing from embodiments provided herein.

Figure 3:
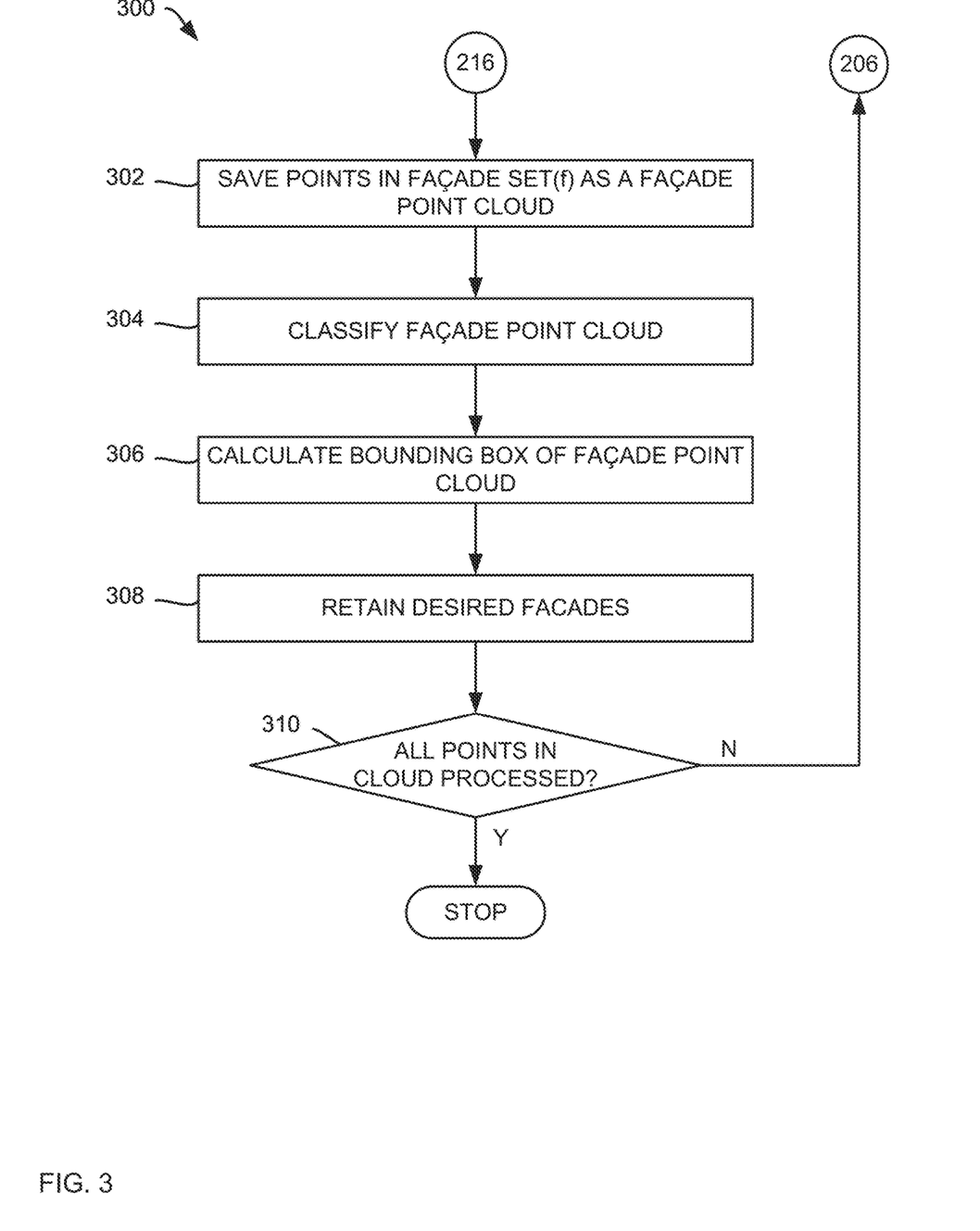
FIG. 3 is an illustrative flowchart of methods for façade segmentation in accordance with embodiments of the present invention.

Method steps 206 to 216 and 302 to 310 collectively perform region growing to find all facades. As such, at a next step 206, the method creates a façade set (f). A façade set will include all points in a particular or selected façade point cloud. At a next step 208, the method pushes onto a queue (q), a point ($qp_x$) from the voxel downsampled 3D point cloud and the point normal ($qn_x$) corresponding with the point. At a next step 210, the method selects and removes a topmost point from queue (q) and adds the queue point ($qp_x$) to the façade set (f). In other words, the method places an initial point and point normal in the queue. Every time the topmost point is selected from the queue, that point is added to the façade set and removed from the queue. At a next step 212, the method performs a neighborhood search around the added topmost point ($fp_x$) in the façade set. That is, a radius/knn hybrid nearest neighbor search around this point is computed. The term, "knn" refers to a k-nearest neighbor search. The term "radius" indicates a limit to the search to within a radius. Therefore, the hybrid search is a search within a radius of up to k points.

At a next step 214, if a neighboring point matches the topmost point in the façade set, the neighboring point is added to the queue (q) for further processing. Thus, the region around a selected point is grown by adding points having a similar point normal within a desired threshold. In embodiments, point normal are compared by computing the cosine of the angle. If this comparison is above approximately 0.85, then the points are considered to have similar normals. The method continues to a step 216 to determine whether the queue (q) is empty. If the method determines at a step 216 that the queue (q) is not empty, the method returns to a step 210. If the method determines at a step 216 that the queue (q) is empty, the method continues to a step 302.

Figure 8:
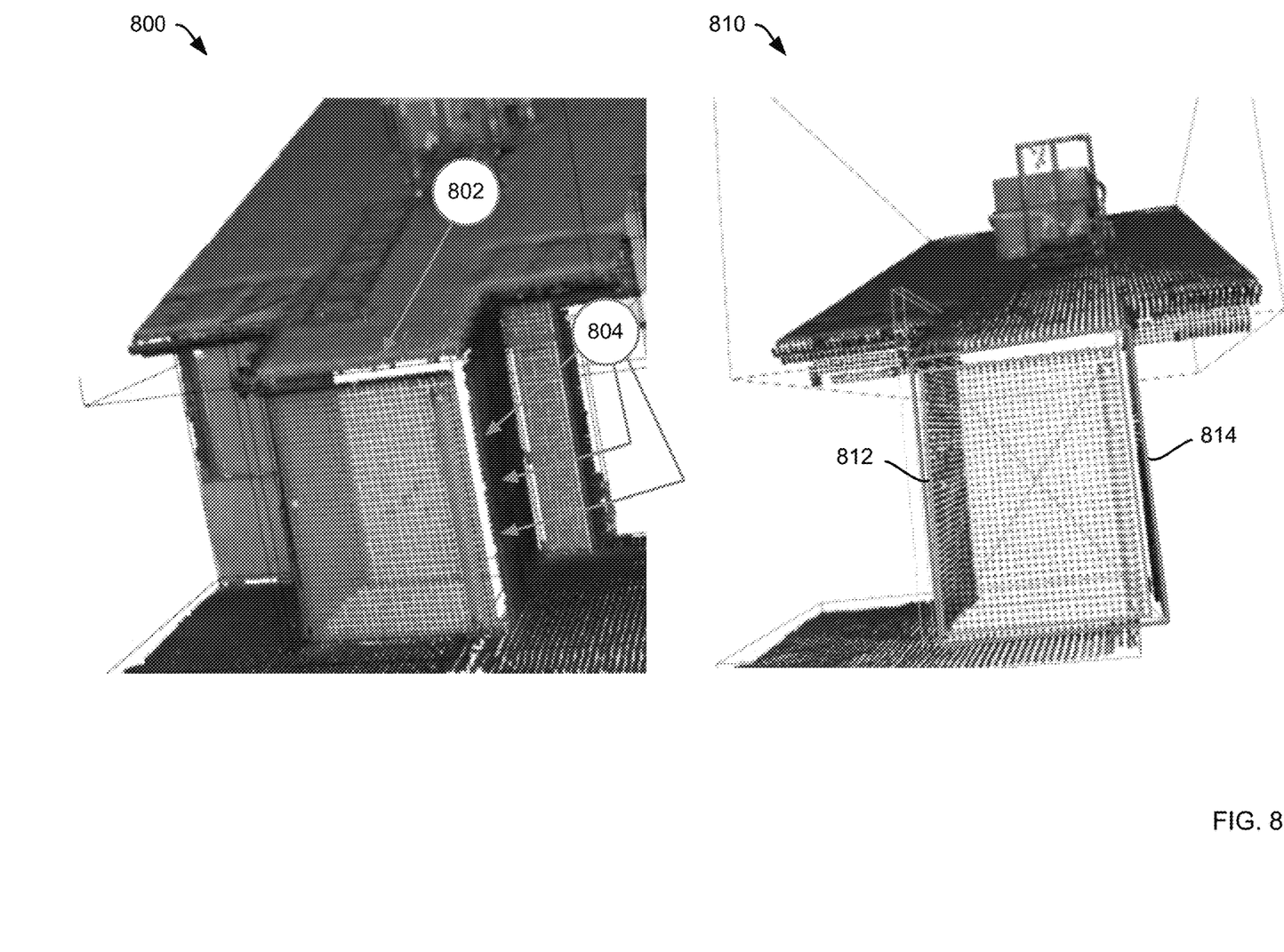
FIG. 8 is an illustrative representation of boundary boxes in accordance with embodiments of the present invention.

At a next step 302, the method saves all points in the façade set (f) as a façade point cloud—each façade set representing a different façade. At a next step 304, the method classifies the façade point cloud using Random Sample Consensus (RANSAC) to classify the façade as being horizontal, vertical, or other. At a next step 306, the method calculates a bounding box of the façade point cloud. One reason calculating the bounding boxes of the set of points is desirable is because these bounding boxes retain the spatial location of each facade. In this manner, a user is able to return to the higher resolution original point cloud to generate each facade by capturing all the points within the bounding box. FIG. 8 is an illustrative representation of bounding boxes in accordance with embodiments of the present invention. In particular, area 800 illustrates gaps 802 and 804 between façades. Methods provided herein create a new bounding box 814 in areas 810. Old bounding box 812 is also illustrated. Returning to FIG. 3, at a next step, the method retains all desired facades. In practice, all the facades with a greater number of points than a desired percentage threshold are retained. In some embodiments, the percentage threshold is approximately 0.02%. At a next step 310, the method determines whether all points in the point cloud have been processed. If the method determines at a step 310 that all points in the point cloud have not been processed, the method returns to a step 206. If the method determines at a step 310 that all points in the point cloud have been processed, the method ends.

Figure 4:
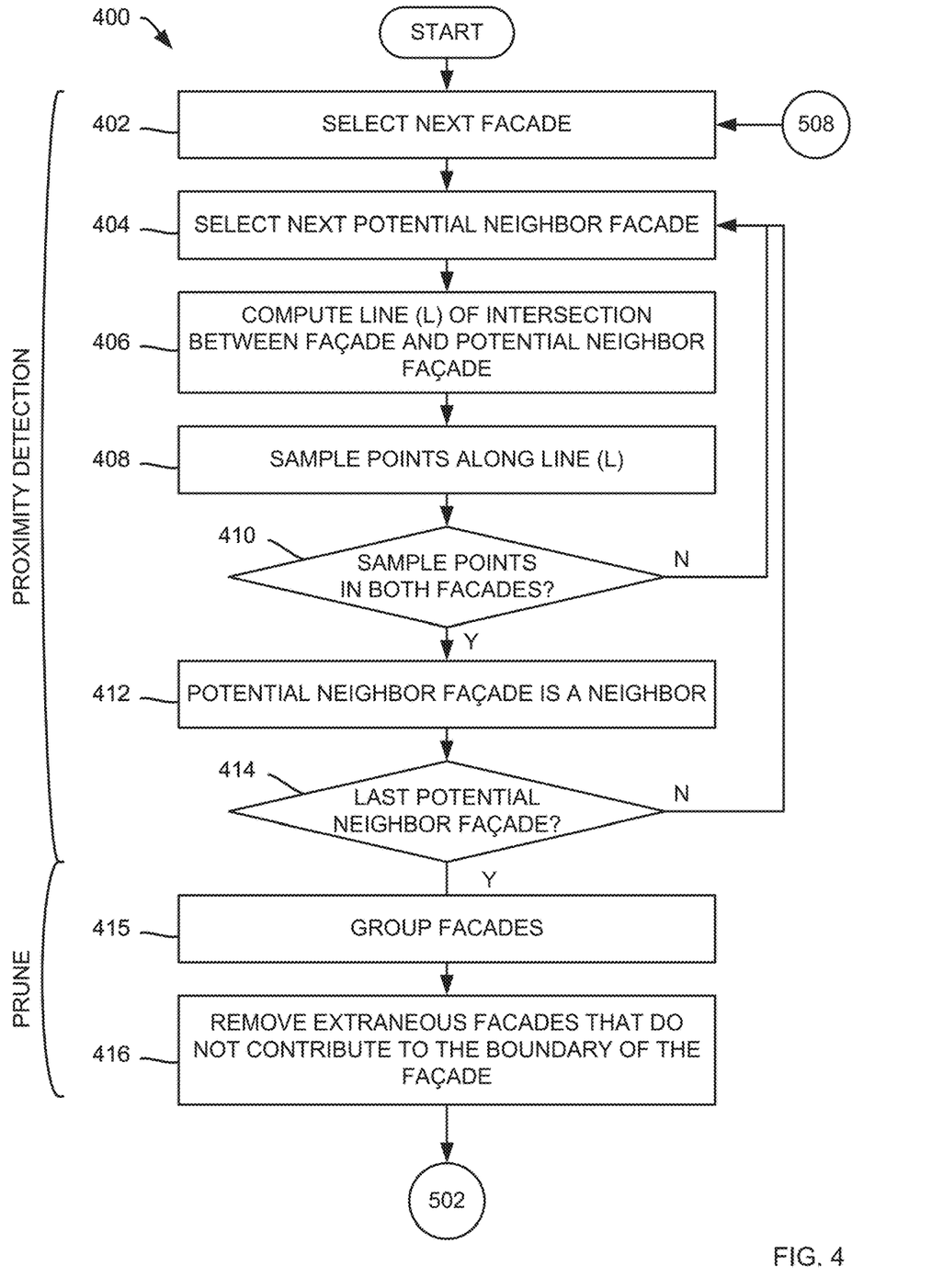
FIG. 4 is an illustrative flowchart of methods for proximity detection and pruning in accordance with embodiments of the present invention.

FIG. 4 is an illustrative flowchart 400 of methods for proximity detection and pruning in accordance with embodiments of the present invention. Methods illustrated invoke proximity detection to determine neighboring facades of a selected façade; pruning to remove extraneous facades that will not contribute to façade segmentation; and polygonising the façades remaining after the pruning. Thus, at a first step 402, the method selects a façade, the method proceeds to a step 404 to select a potential neighboring façade. At a next step 406, the method computes a line (1) of intersection between the façade and the potential neighbor façade. The method then samples point along line (1) at a step 408. At a next step 410, the method determines whether the sample points occur in both facades. If the method determines at a step 410 that the sample points are not in both facades, the method returns to a step 404 to select another potential neighboring façade. If the method determines at a step 410 that the sample points are in both facades, then the potential neighboring façade is a neighboring façade. At a step 414, the method determines whether all potential neighboring facades have been processed. If the method determines at a step 414 that all potential neighboring facades have not been processed, the method returns to a step 404 to select another potential neighboring façade. If the method determines at a step 414 that all potential neighboring facades have been processed, the method continues to a step 415 to group similar facades. Steps 415 and 416 are collectively referred to as pruning. One of the tools useful for the user in pruning is to group together similar facades (step 415). For example, if the facade segmentation produces the top and bottom of the roof facades, it may be desirable to group these together so the user can choose which one to retain for polygonization. Grouping together all facades with similar equations and proximity as defined by desired criteria. These criteria are defined as follows:

a) Similar Equations: For an equation defined as $ax+by+cz+d=0$, we define similarity between equations by whether the normals of each equation are similar (cosine between each equation is above 0.9) and the difference in the d values is within some 0.2.

b) Proximity: if 60% of each facade overlaps one another.

As such, facades are grouped together so that for each set, each pair of facades satisfies these criteria.

Figure 9:
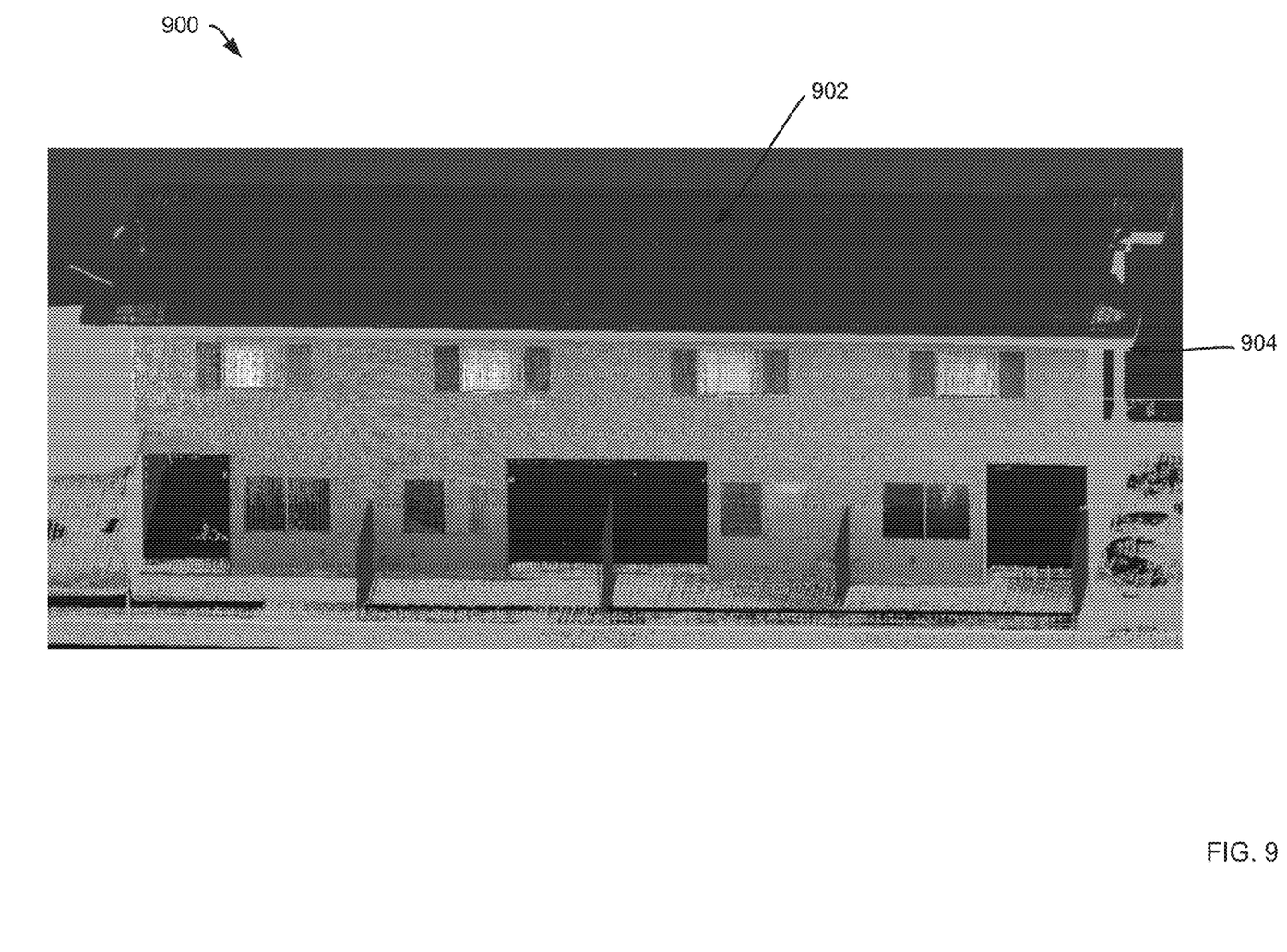
FIG. 9 is an illustrative representation utilized for pruning in accordance with embodiments of the present invention.

At a next step 416, methods proceed to removed extraneous facades that do not contribute to the boundary of the façade. Methods disclosed include a pruning step to ensure that polygonization works properly. Turning briefly to FIG. 9, FIG. 9 is an illustrative representation 900 utilized during pruning in accordance with embodiments of the present invention. As illustrated, the auto façade segmentation finds two planes for the roof: green plane 904 and red plane 902. In practice, the user may select the green plane and discard the red plane so that the polygonization of the head of façade has the right boundary on the top: it is the green plane of the roof that truly intersects the vertical facade shown below, not the red plane.

Figure 5:
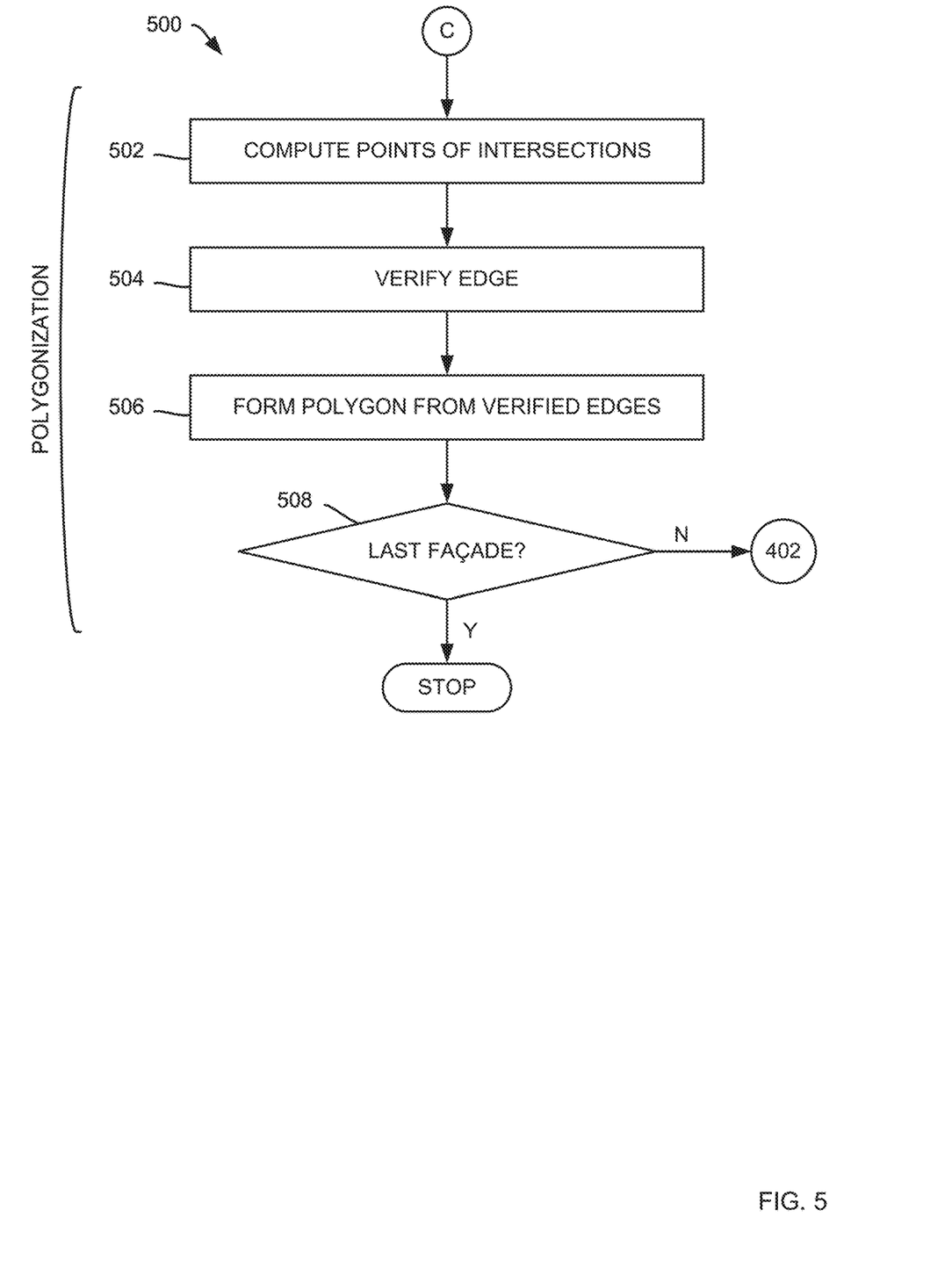
FIG. 5 is an illustrative flowchart of methods for polygonization in accordance with embodiments of the present invention.
Figure 10:
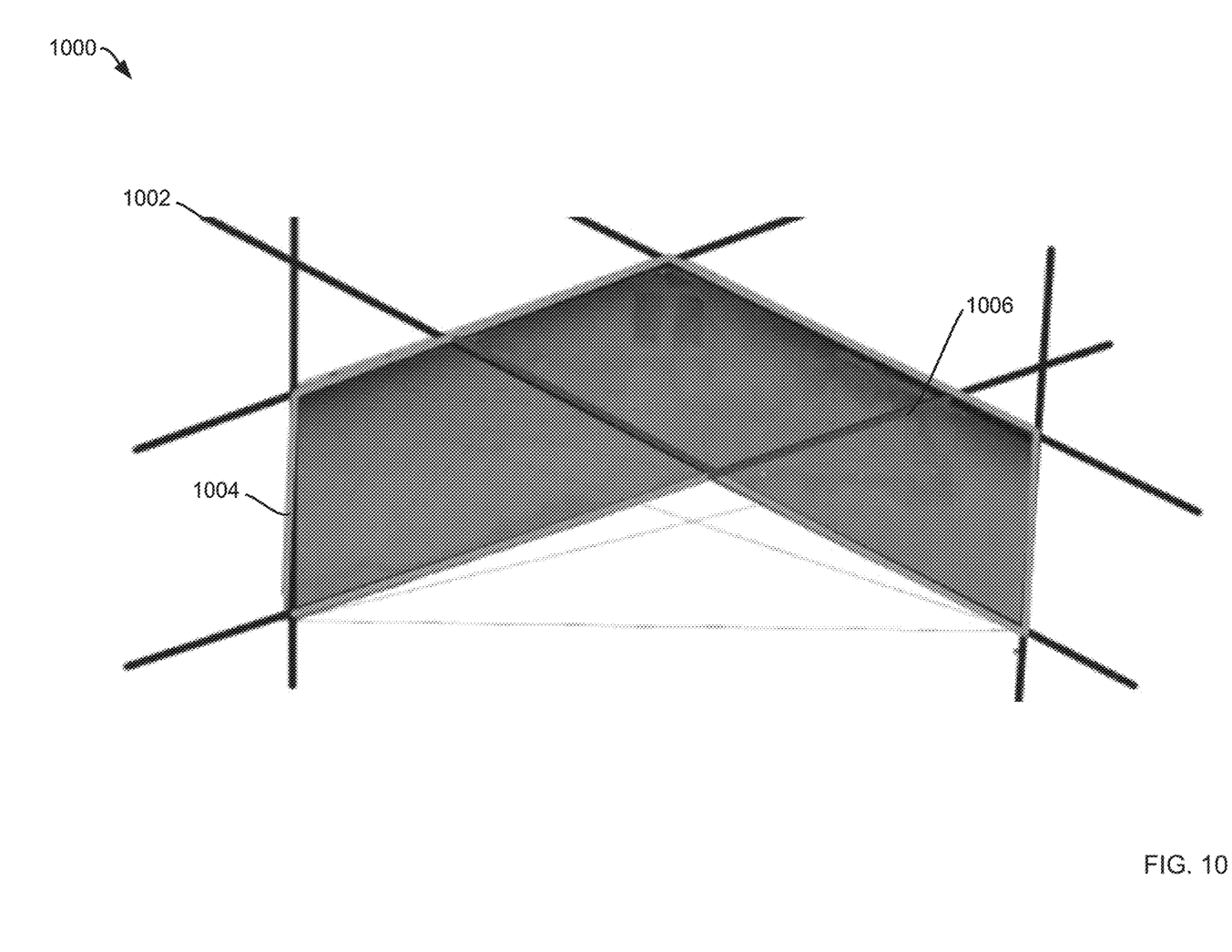
FIG. 10 is an illustrative representation of edge analysis in accordance with embodiments of the present invention.

FIG. 5 is an illustrative flowchart 500 of methods for polygonization in accordance with embodiments of the present invention. At a first step 502, the method computes all points of intersection for the facades. At a next step 504, the method verifies the edge such that each verified edge must border a side of the facade so that there are only points on one side of the façade. Turning briefly to FIG. 10, FIG. 10 is an illustrative representation 1000 of edge analysis in accordance with embodiments of the present invention. As illustrated, blue lines 1002 are lines of intersection between facades. Green lines 1004 are verified and valid edges. Red lines 1006 are invalid edges. Thus, verified and valid edges are present on only one side of the façade. At a next step 506, the method forms a polygon from verified edges that represents the façade. Turning briefly to FIG. 6, polygonised representation 602 is illustrated that corresponds with 3D point cloud 600. Returning to FIG. 5, at a next step 508, the method determines whether the last façade has been polygonised. If the method determines at a step 508 that the last façade has not been polygonised, the method returns to a step 402 to select the next façade. If the method determines at a step 508 that the last façade has been polygonised, the method ends.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A method for processing a 3D point cloud of a single building into polygons using an electronic computing device, the method comprising:
   causing the electronic computing device to receive the 3D point cloud of the single building;
   causing the electronic computing device to segment the 3D point cloud of the single building into a plurality of facades; and
   causing the electronic computing device to generate a continuous boundary polygon for each of the plurality of façades of the single building representing a shape of a corresponding facade.

2. The method of claim 1, wherein the causing the electronic computing device to segment the 3D point cloud into a plurality of facades comprises:
   performing voxel downsampling operation on the 3D point cloud;
   calculating a point normal for every point in the voxel downsampled 3D point cloud; and
   performing region growing for each façade of the 3D point cloud utilizing the point normal for every point in the voxel down sampled 3D point cloud to find each of the plurality of facades.

3. The method of claim 2, wherein the calculating the point normal encodes information corresponding with the surface of a plane by finding adjacent points and calculating a principal axis of the adjacent points using a covariance analysis.

4. The method of claim 2, wherein the performing region growing comprises:
   creating a façade set;
   pushing onto a queue a point from the 3D point cloud and the point normal corresponding with the point;
   selecting a topmost point and corresponding point normal from the queue;
   removing the selected topmost point and corresponding point normal from the queue;
   adding the selected topmost point and corresponding point normal from the queue to the façade set;
   performing a neighborhood search around the added topmost point in the façade set;
   if a neighboring point matches the topmost point in the façade set, adding the neighboring point to the queue;
   if the queue is empty, saving all points in the façade set as a façade point cloud;
   classifying the façade point cloud;
   calculating a bounding box of the façade point cloud; and
   retaining all desired facades.

5. The method of claim 4 further comprising:
   after performing the neighborhood search around the added topmost point in the façade set, if the queue is not empty, returning to selecting the topmost point.

6. The method of claim 4 further comprising:
   continuing to the creating the façade set until all points in the 3D point cloud are processed.

7. The method of claim 1, wherein the causing the electronic computing device to generate the continuous boundary polygon for each of the plurality of façades of the single building representing the shape of the corresponding facade comprises:
   detecting neighboring planes of selected facade that intersect with the selected façade;
   pruning extraneous planes from the neighboring planes that do not intersect the continuous boundary of the selected facade; and
   generating the continuous boundary polygon using the remaining neighboring planes that intersect the selected façade.

8. The method of claim 7, wherein the detecting neighboring planes comprises:
   selecting a façade;
   selecting a potential neighboring plane;
   computing a line of intersection between the façade and the potential neighboring plane; and
   sampling points along the line of intersection, wherein if sampled points are present in both the selected façade and the potential neighboring plane, the potential neighboring plane becomes a neighboring plane.

9. The method of claim 8, wherein the generating the continuous boundary polygon comprises:
   computing points of intersections between the selected façade and each neighboring plane;
   verifying edges of the façade such that each verified edge must border a side of the facade such that there are only points on one side of the facade; and
   forming a polygon from verified edges that represents the façade.

10. The method of claim 7, wherein the pruning the extraneous facades further comprises:
    grouping together all facades with similar equations and proximity.

11. A method for processing a 3D point cloud of a single building into polygons using an electronic computing device, the method comprising:
    causing the electronic computing device to receive the 3D point cloud of the single building;
    causing the electronic computing device to segment the 3D point cloud of the single building into a plurality of facades, wherein the causing the electronic computing device to segment the 3D point cloud into a plurality of facades comprises
        calculating a point normal for every point in the voxel downsampled 3D point cloud; and
        performing region growing for each façade of the 3D point cloud utilizing the point normal for every point in the 3D point cloud to find each of the plurality of facades, wherein the performing region growing comprises:
        creating a façade set;
        pushing onto a queue a point from the 3D point cloud and the point normal corresponding with the point;
        selecting a topmost point and corresponding point normal from the queue;
        removing the selected topmost point and corresponding point normal from the queue;
        adding the selected topmost point and corresponding point normal from the queue to the façade set;
        performing a neighborhood search around the added topmost point in the façade set;
        if a neighboring point matches the topmost point in the façade set, adding the neighboring point to the queue;
        if the queue is empty, saving all points in the façade set as a façade point cloud;
        classifying the façade point cloud;

calculating a bounding box of the façade point cloud; and retaining all desired facades; and causing the electronic computing device to generate a continuous boundary polygon for each of the plurality of façades of the single building representing a shape of a corresponding façade.

12. The method of claim 11, wherein the causing the electronic computing device to segment the 3D point cloud into a plurality of facades further comprises:

optionally performing voxel downsampling operation on the 3D point cloud.

13. The method of claim 11, wherein the calculating the point normal encodes information corresponding with the surface of a plane by finding adjacent points and calculating a principal axis of the adjacent points using a covariance analysis.

14. The method of claim 11 further comprising:

after performing the neighborhood search around the added topmost point in the façade set, if the queue is not empty, returning to selecting the topmost point.

15. The method of claim 11 further comprising:

continuing to the creating the façade set until all points in the 3D point cloud are processed.

16. The method of claim 11, wherein the causing the electronic computing device to generate the continuous boundary polygon for each of the plurality of façades of the single building representing the shape of the corresponding facade comprises:

detecting neighboring planes of selected facade that intersect with the selected façade;

pruning extraneous planes from the neighboring planes that do not intersect the continuous boundary of the selected facade; and generating the continuous boundary polygon using the remaining neighboring planes that intersect the selected façade.

17. The method of claim 16, wherein the detecting neighboring planes comprises:

selecting a façade;

selecting a potential neighboring plane;

computing a line of intersection between the façade and the potential neighboring plane; and sampling points along the line of intersection, wherein if sampled points are present in both the selected façade and the potential neighboring plane, the potential neighboring plane becomes a neighboring plane.

18. The method of claim 16, wherein the generating the continuous boundary polygon comprises:

computing points of intersections between the selected facade and each neighboring plane;

verifying edges of the façade such that each verified edge must border a side of the facade such that there are only points on one side of the facade; and forming a polygon from verified edges that represents the façade.

19. Method of claim 16, wherein the pruning the extraneous facades further comprises:

grouping together all facades with similar equations and proximity.

* * * * *